(12) United States Patent
Jiang

(10) Patent No.: US 9,392,593 B2
(45) Date of Patent: Jul. 12, 2016

(54) METHOD AND BASE STATION FOR ADJUSTING DOWNLINK GRANT PHYSICAL DOWNLINK CONTROL CHANNEL OF UE

(75) Inventor: Dajie Jiang, Beijing (CN)

(73) Assignee: CHINA MOBILE COMMUNICATIONS CORPORATION (CN)

( * ) Notice: Subject to any disclaimer, the term of this patent is extended or adjusted under 35 U.S.C. 154(b) by 273 days.

(21) Appl. No.: 13/988,905

(22) PCT Filed: Nov. 24, 2011

(86) PCT No.: PCT/CN2011/082857
§ 371 (c)(1),
(2), (4) Date: Aug. 5, 2013

(87) PCT Pub. No.: WO2012/069001
PCT Pub. Date: May 31, 2012

(65) Prior Publication Data
US 2013/0308491 A1    Nov. 21, 2013

(30) Foreign Application Priority Data

Nov. 24, 2010   (CN) .......................... 2010 1 0557140

(51) Int. Cl.
*H04W 72/04* (2009.01)
*H04W 52/32* (2009.01)
(Continued)

(52) U.S. Cl.
CPC ............ *H04W 72/042* (2013.01); *H04W 52/24* (2013.01); *H04W 52/325* (2013.01); *H04L 1/0026* (2013.01); *H04L 1/1607* (2013.01); *H04L 5/0053* (2013.01); *H04W 52/12* (2013.01); *H04W 52/143* (2013.01); *H04W 52/241* (2013.01);

(Continued)

(58) Field of Classification Search
None
See application file for complete search history.

(56) References Cited

U.S. PATENT DOCUMENTS

2004/0252670 A1 * 12/2004 Rong et al. .................... 370/343
2009/0285160 A1    11/2009 Cheng et al.
(Continued)

FOREIGN PATENT DOCUMENTS

| CN | 101594668 A | 12/2009 |
| CN | 101622902 A | 1/2010 |

(Continued)

OTHER PUBLICATIONS

3rd Generation Partnership Project; Technical Specification Group Radio Access Network (3GPP TS 36.213); Evolved Universal Terrestrial Radio Access (E-UTRA); Physical layer procedures (Sep. 2010) Release 9, pp. 1-80.
(Continued)

*Primary Examiner* — Chi H Pham
*Assistant Examiner* — Vladislav Agureyev
(74) *Attorney, Agent, or Firm* — Hauptman Ham, LLP

(57) ABSTRACT

The present invention provides a method and a base station for adjusting a downlink grant physical downlink control channel of a UE. The method comprises: receiving a signal transmitted on an uplink resource corresponding to a current downlink grant physical downlink control channel from the UE; judging whether or not the UE has received the downlink grant physical downlink control channel successfully in accordance with the received signal; and determining the number of CCEs occupied by the downlink grant physical downlink control channel and/or a transmission power of the downlink grant physical downlink control channel in accordance with the judgment result.

16 Claims, 1 Drawing Sheet

(51) Int. Cl.

| | | |
|---|---|---|
| H04W 52/12 | (2009.01) | |
| H04W 52/14 | (2009.01) | |
| H04W 52/24 | (2009.01) | |
| H04W 52/48 | (2009.01) | |
| H04W 52/36 | (2009.01) | |
| H04W 52/54 | (2009.01) | |
| H04L 1/00 | (2006.01) | |
| H04L 1/16 | (2006.01) | |
| H04L 5/00 | (2006.01) | |

(52) U.S. Cl.
CPC ........... *H04W 52/242* (2013.01); *H04W 52/245* (2013.01); *H04W 52/365* (2013.01); *H04W 52/48* (2013.01); *H04W 52/54* (2013.01)

(56) References Cited

U.S. PATENT DOCUMENTS

| | | | |
|---|---|---|---|
| 2010/0034092 A1 | 2/2010 | Krishnamurthy et al. | |
| 2010/0041430 A1* | 2/2010 | Ishii | H04L 5/0075 455/522 |
| 2010/0091724 A1 | 4/2010 | Ishii et al. | |
| 2010/0172290 A1* | 7/2010 | Nam | H04L 1/1854 370/328 |
| 2010/0265862 A1 | 10/2010 | Choi et al. | |
| 2011/0267967 A1* | 11/2011 | Ratasuk | H04L 5/0053 370/252 |
| 2011/0299490 A1 | 12/2011 | Nordstrom et al. | |
| 2012/0014330 A1* | 1/2012 | Damnjanovic | H04L 5/001 370/329 |
| 2012/0026985 A1* | 2/2012 | Ren | H04L 1/0025 370/336 |
| 2012/0039170 A1* | 2/2012 | Ball et al. | 370/230 |
| 2012/0093118 A1* | 4/2012 | Peters | 370/329 |
| 2012/0230211 A1* | 9/2012 | Sandberg et al. | 370/252 |
| 2014/0192759 A1* | 7/2014 | Son et al. | 370/329 |

FOREIGN PATENT DOCUMENTS

| | | |
|---|---|---|
| CN | 101843012 A | 9/2010 |
| EP | 2684310 A1 | 1/2014 |
| WO | 2009/061106 A2 | 5/2009 |
| WO | 2009/096698 A2 | 8/2009 |
| WO | 2010082877 A1 | 7/2010 |
| WO | 2010/129810 A2 | 11/2010 |
| WO | 2012/121636 A1 | 9/2012 |

OTHER PUBLICATIONS

Chinese Office Action issued in Chinese Application No. 20101055714000, dated Dec. 30, 2013.
International Search Report mailed Mar. 1, 2012 in International Application No. PCT/CN2011/082857, filed Nov. 24, 2011.
Written Opinion mailed Mar. 1, 2012 in International Application No. PCT/CN2011/082857, filed Nov. 24, 2011.
European Patent Office, Supplementary European Search Report in European Application No. 11 84 3963, dated Nov. 23, 2015.

* cited by examiner

METHOD AND BASE STATION FOR ADJUSTING DOWNLINK GRANT PHYSICAL DOWNLINK CONTROL CHANNEL OF UE

The present application is a National Phase of International Application Number PCT/CN2011/082857, filed Nov. 24, 2011, and claims the priority of the Chinese patent application No. 201010557140.0, filed on Nov. 24, 2010 and entitled "Method and base station for adjusting downlink grant physical downlink control channel of UE".

TECHNICAL FIELD

The present invention relates to the field of wireless communication technology, in particular to a method and a base station for adjusting a downlink grant physical downlink control channel of a User Equipment (UE).

BACKGROUND

In 3GPP (3rd Generation Partnership Project) LTE (Long Term Evolution) Release 8 and Release 9 specifications, each downlink subframe includes 14 OFDM (Orthogonal Frequency Division Multiplexing) symbols within a control area and a data area. The data area is carried by a PDSCH (Physical Downlink Shared Channel). The first one to four OFDM symbols of each subframe are corresponding to the control area. The control area includes a PCFICH (Physical Control Format Indicator Channel), a PDCCH (Physical Downlink Control Channel), a PHICH (Physical HARQ Indicator Channel), CRSs (Cell-specific Reference Signal) and some blank REs (Resource Element). DCI (Downlink Control Information) carried in the PDCCH includes resource allocation information and other control information of one or more UEs. Generally, one subframe may include a plurality of PDCCHs, each PDCCH corresponding to a different UE.

PDCCH includes UL Grant (Uplink Grant) PDCCH and DL Grant (Downlink Grant) PDCCH. Each PDCCH may be dispersed over the entire system bandwidth and all the OFDM symbols corresponding to the control area. In accordance with channel conditions corresponding to the UEs, the DL Grant PDCCH may occupy 1, 2, 4 or 8 CCEs (Control Channel Element) adaptively, and each CCE includes 36 REs. For example, for the UEs with a well channel condition, the DL Grant PDCCH may occupy 1 or 2 CCEs, and for the UEs with a bad channel condition, the DL Grant PDCCH may occupy 4 or 8 CCEs. To be specific, the number of CCEs occupied by the DL Grant PDCCH is mainly determined by PDCCH link adaption, and such a procedure mainly comprises: receiving, by a base station, a wideband CQI (Channel Quality Indicator) of a corresponding data area reported by the UE; determining, by the base station, an SINR (Signal to Interference plus Noise Ratio) corresponding to the CQI in accordance with the wideband CQI reported by the UE; and determining, by the base station, the number of CCEs occupied by the DL Grant PDCCH allocated to the UE in accordance with the SINR. The PDCCH link adaptation finishes at this point.

Through the above process, the base station can determine the number of CCEs allocated to the DL Grant PDCCH of the UE in accordance with the wideband CQI of the corresponding data area reported by the UE. However, the transmission mode adopted by the control area is different from that adopted by the data area. Usually, the control area adopts a transmission mode of 2*2 SFBC (Space Frequency Block Code), while the data area adopts eight transmission modes, i.e., Transmission Mode 1 to Transmission Mode 8. Moreover, the inter-cell interference on a transmission signal over the control area is also different from that over the data area. The wideband CQI of the corresponding data area of the base station reported by the UE can merely reflect the channel quality of the data area rather than the channel quality of the control area, so that the number of CEEs allocated by the base station to the DL Grant PDCCH of the UE is of low accuracy. As a result, it is unable to realize the PDCCH link adaptation accurately and to ensure reliability of the DL Grant PDCCH transmission.

SUMMARY

The present invention provides a method and a base station for adjusting a downlink grant physical downlink control channel of a UE, so as to improve accuracy of the number of CCEs allocated to the DL Grant PDCCH and improve reliability of PDCCH transmission.

In one aspect, the present invention provides a method for adjusting a downlink grant physical downlink control channel of a UE, comprising:

receiving a signal transmitted on an uplink resource corresponding to a current downlink grant physical downlink control channel from the UE;

judging whether or not the UE has received information transmitted on the downlink grant physical downlink control channel successfully in accordance with the received signal; and determining the number of CCEs occupied by the downlink grant physical downlink control channel and/or a transmission power of the downlink grant physical downlink control channel in accordance with the judgment result.

In another aspect, the present invention provides a base station for adjusting a downlink grant physical downlink control channel of a UE, comprising:

a receiving module, configured to receive a signal transmitted on an uplink resource corresponding to a current downlink grant physical downlink control channel from the UE;

a judging module, configured to judge whether or not the UE has received information transmitted on the downlink grant physical downlink control channel successfully in accordance with the signal received by the receiving module; and an adjusting module, configured to determine the number of CCEs occupied by the downlink grant physical downlink control channel and/or a transmission power of the downlink grant physical downlink control channel in accordance with the judgment result of the judging module.

Through the above technical solutions of the present invention, it is able to receive the signal transmitted on the uplink resource corresponding to the current downlink grant physical downlink control channel from the UE, judge whether or not the UE has received information transmitted on the downlink grant physical downlink control channel successfully in accordance with the received signal, and determine the number of CCEs occupied by the downlink grant physical downlink control channel and/or the transmission power of the downlink grant physical downlink control channel in accordance with the judgment result. The number of CCEs occupied by the downlink grant physical downlink control channel and/or the transmission power of the downlink grant physical downlink control channel can be determined in accordance with the reception condition of the signal on the downlink grant physical downlink control channel. As a result, it is able to improve the accuracy of the determined number of CCEs, realize the PDCCH link adaptation in more accurate manner, and improve the reliability of the PDCCH transmission.

DETAILED DESCRIPTION

The present invention is described hereinafter with reference to the drawings in conjunction with the embodiments.

PDCCH dedicated to a UE includes resource allocation information and other control information of the UE. To be specific, it includes DL Grant (or DL Assignment) information indicating a downlink resource allocation and transmission format and UL Grant information indicating an uplink resource allocation and transmission format. The present invention provides solutions for performing DL Grant PDCCH link adaptation in a more accurate manner.

Figure 1:
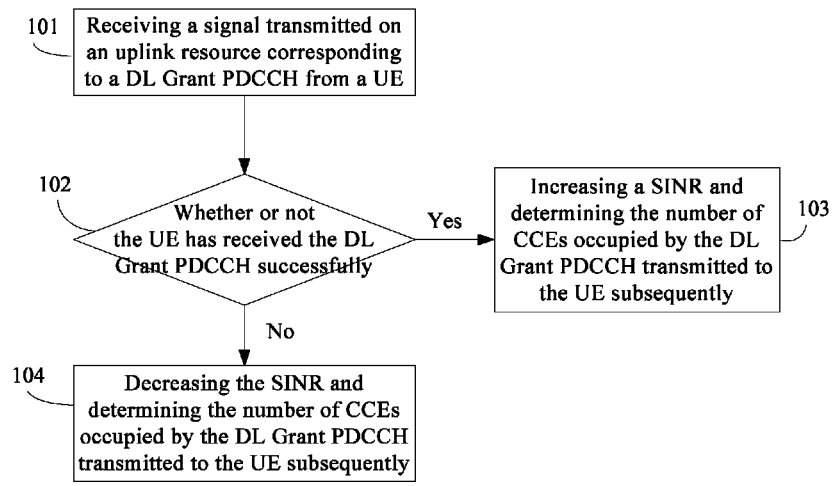
FIG. 1 is a flow chart of a method for adjusting a downlink grant physical downlink control channel of a UE according to embodiments of the present invention.

FIG. 1 shows a method for adjusting a downlink grant physical downlink control channel of a UE. In this embodiment, the adjustment of the downlink grant physical downlink control channel of the UE specifically means the adjustment of the number of CCEs occupied by the downlink grant physical downlink control channel of the UE and/or a transmission power of the downlink grant physical downlink control channel.

At first, after transmitting a DL Grant PDCCH and a corresponding PDSCH to the UE, i.e., transmitting DL Grant PDCCH information to the UE, a base station receives a signal transmitted on an uplink resource corresponding to the DL Grant PDCCH from the UE in step 101. The uplink resource may be an ACK (Acknowledgement)/NACK (Negative Acknowledgement) resource.

Then, the base station judges whether or not the UE has received the DL Grant PDCCH, i.e., the DL Grant PDCCH information, successfully in accordance with the received signal in step 102.

To be specific, in step 102, if the base station detects that an ACK/NACK signal is received from the UE on an uplink resource (e.g., an ACK/NACK resource) corresponding to the DL Grant PDCCH, it means that the UE has received the DL Grant PDCCH successfully, and if the base station detects that a DTX (Discontinuous transmission) signal is received and the signal indicates that no corresponding ACK or NACK signal is transmitted from the UE, it means that the UE has not received the DL Grant PDCCH successfully.

Next, when it is determined in step 102 that the UE has received the DL Grant PDCCH successfully, the base station increases a current SINR of the UE and determines the number of CCEs occupied by the DL Grant PDCCH transmitted to the UE next time in accordance with the increased SINR in step 103.

To be specific, in step 103, the current SINR of the UE may be increased by adding a positive modified value to the current SINR or subtracting a negative modified value from the current SINR, and the number of CCEs occupied by the DL Grant PDCCH transmitted to the UE may be determined in accordance with the modified SINR. It should be appreciated that, in this case, the number of CCEs determined in accordance with the modified SINR will be equal to or less than the number of CCEs previously occupied by the DL Grant PDCCH of the UE.

When it is determined in step 102 that the UE has not received the DL Grant PDCCH successfully, the base station will decrease the current SINR of the UE and determines the number of CCEs occupied by the DL Grant PDCCH transmitted to the UE next time in accordance with the decreased SINR in step 104.

To be specific, in step 104, the current SINR of the UE may be decreased by subtracting a positive modified value from the current SINR or adding a negative modified value to the current SINR, and then the number of CCEs occupied by the DL Grant PDCCH transmitted to the UE may be determined in accordance with the modified SINR. It should be appreciated that, in this case, the number of CCEs determined in accordance with the modified SINR will be equal to or greater than the number of CCEs previously occupied by the DL Grant PDCCH of the UE.

In the above steps 103 and 104, when determining the number of CCEs occupied by the DL Grant PDCCH transmitted to the UE in accordance with the modified SINR, a demodulation threshold SINR corresponding to the respective number of CCEs is used. To be specific, the number of CCEs each corresponds to a demodulation threshold that provides a maximum value of the corresponding SINR. Usually, the more the CCEs, the higher the corresponding demodulation threshold. For example, the demodulation threshold SINR for 4 CCEs is −1 dB, and the demodulation threshold SINR for 8 CCEs is −6 dB. If the modified SINR is less than −1 dB, the number of CCEs occupied by the DL Grant PDCCH transmitted to the UE is adjusted to 8.

At this point, the process of adjusting the number of CCEs occupied by the DL Grant PDCCH of the UE is ended.

In one embodiment, the current SINR is indicated by an up-to-date wideband CQI reported by the UE.

In another embodiment, the current SINR is determined in accordance with power headroom reported by the UE. To be specific, the base station acquires an up-to-date path loss value from the UE to the base station in accordance with the power headroom reported by the UE, and then acquires the current SINR in accordance with the path loss value. In this case, for example, a mapping table of the path loss values to the SINRs may be pre-stored at the base station, and the SINR corresponding to a path loss value may be acquired by looking up the mapping table. The base station can update the mapping table if desired.

In yet another embodiment, the current SINR is a SINR recently transmitted to the PDCCH of the UE. In this case, the SINR initially transmitted from the base station to the PDCCH of the UE may be set as an initial value (e.g., a demodulation threshold of a 2 CCEs PDCCH), or set in accordance with the wideband CQI reported by the UE.

The DL Grants and the corresponding PUSCHs (Physical Uplink Shared Channel) in the above-mentioned embodiments may include: a dynamic scheduling DL Grant and its corresponding PUSCH; and an uplink semi-persistent scheduling active signaling and the first PUSCH allocated by a semi-persistent scheduling active signaling. The uplink semi-persistent scheduling active signaling and a non-first PUSCH allocated by the semi-persistent scheduling active signaling is not involved in the present invention.

In the above embodiments, the positive and negative modified values may be set in accordance with a PDCCH BLER (Block Error Rate) target value. For example, the PDCCH BLER target value may be set as 1%. To be specific, if the UE has successfully received the DL Grant PDCCH, the modified value for modifying the current SINR may be determined by the following equation: the modified value=a previous modified value for modifying the SINR+a step size*the PDCCH BLER target value; If the UE has not successfully received the DL Grant PDCCH, the modified value for modifying the current SINR may be determined by the following equation: the modified value=a previous modified value for modifying the SINR−a step size*(1-the PDCCH BLER target value); The step size may be set as, for example, 0.5 dB or others.

It should be appreciated that, in the above steps, the increase or decrease of the SINR will not necessarily decrease or increase the number of CCEs occupied by the DL Grant PDCCH, and the current number of CCEs may likely remain unchanged. The number of CCEs occupied by the DL Grant PDCCH will decrease or increase only when the SINR increases or decreases to a certain extent (the extent to which the number of CCEs needs to be adjusted, i.e., when it reaches the demodulation threshold to adjust the number of CCEs).

Alternatively or additionally, in one embodiment, after judging whether or not the UE has received the DL Grant PDCCH successfully, the transmission power of the DL Grant PDCCH may be adjusted. To be specific, as mentioned above, when it is judged that the UE has received the DL Grant PDCCH successfully, the current SINR of the UE may be increased, and when it is judged that the UE has not received the DL Grant PDCCH successfully, the current SINR of the UE may be decreased. The transmission power of the DL Grant may be determined in accordance with the modified SINR. In the case where the SINR is increased, i.e., the UE has received the DL Grant successfully, the transmission power of the DL Grant PDCCH may be decreased correspondingly, and in the case where the SINR is decreased, i.e., the UE has not received the DL Grant successfully, the transmission power of the DL Grant PDCCH may be increased correspondingly. To be specific, the process of determining the transmission power of the DL Grant in accordance with the modified SINR is shown as follows.

If the modified SINR is between the demodulation threshold SINRs corresponding to two CCE levels respectively, for example, the modified SINR is −3 dB (presumed that the SINR decreases as compared to the SINR before modification), the demodulation threshold SINR corresponding to 4 CCEs is −2 dB and the demodulation threshold SINR corresponding to 8 CCEs is −7 dB, then the modified SINR is between the demodulation threshold SINRs corresponding to 4 CCEs and 8 CCEs respectively. However, the modified value is less than the demodulation threshold corresponding to 4 CCEs, so the demodulation threshold corresponding to 8 CCEs rather than 4 CCEs is met. In order to decrease the number of CCEs for transmitting the DL Grant PDCCH, the power may be adjusted, i.e., the power of the DL Grant PDCCH transmitted may be increased by 1 dB, and 4 CCEs are used to transmit the DL Grant PDCCH. In the case that the interference value is unchanged, the increase of the transmission power by 1 dB can cause an increase of the SINR on the DL Grant PDCCH by 1 dB too, i.e., the SINR will be −2 dB. As a result, the modified value reaches the demodulation threshold corresponding to 4 CCEs. The condition where the modified SINR increases relative to the SINR before modification is similar to the above, and it will not be repeated herein.

Figure 2:
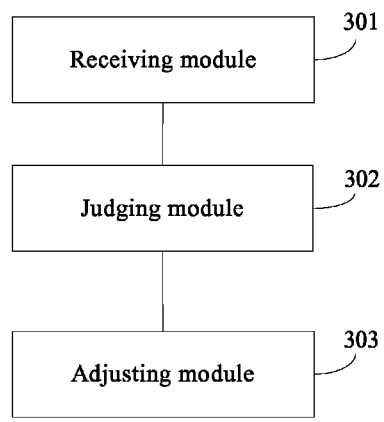
FIG. 2 is a structural schematic view showing a base station for adjusting a downlink grant physical downlink control channel of a UE according to embodiments of the present invention.

FIG. 2 shows a base station 300 for adjusting a DL Grant PDCCH of a UE according to embodiments of the present invention. As shown in FIG. 2, the base station comprises: a receiving module 301 configured to receive a signal transmitted on an uplink ACK/NACK resource corresponding to a current DL Grant PDCH from the UE, a judging module 302 configured to judge whether or not the UE has successfully received the DL Grant PDCCH in accordance with the signal received by the receiving module 301; and an adjusting module 33 configured to determine the number of CCEs occupied by the DL Grant PDCCH in accordance with the judgment result of the judging module 302.

In an embodiment, the judging module 302 is specifically configured to detect whether or not the signal received by the receiving module 301 on the corresponding uplink ACK/NACK resource is an ACK/NACK signal, thereby to determine whether the UE has successfully received the DL Grant PDCCH from the base station. If the judgment result of the judging module 302 is yes, it is determined that the UE has successfully received the DL Grant PDCCH, and otherwise, it is determined that the UE has not successfully received the DL Grant PDCCH.

In an embodiment, the adjusting module 303 is specifically configured to, in the case that the judging module 302 determines that the UE has successfully received the DL Grant, increase a current SINR of the UE and determine the number of CCEs occupied by the DL Grant PDCCH in accordance with the increased SINR, and in the case that the judging module 302 determines that the UE has not successfully received the DL Grant PDCCH, decrease the current SINR of the UE and determine the number of CCEs occupied by the DL Grant PDCCH in accordance with the decreased SINR.

In an embodiment, the current SINR determined by the adjusting module 303 may be indicated by an up-to-date wideband CQI reported by the UE. In another embodiment, the base station acquires an up-to-date path loss value from the UE to the base station in accordance with power headroom reported by the UE, and then acquires the current SINR in accordance with the path loss value. In this case, for example, a mapping table of the path loss values to the SINRs may be pre-stored at the base station, and the SINR corresponding to a path loss value may be acquired by looking up the mapping table. The base station can update the mapping table if desired. In yet another embodiment, the current SINR may be a SINR recently transmitted to the PDCCH of the UE. In this case, the SINR initially transmitted from the base station to the PDCCH of the UE may be set as an initial value (e.g., a demodulation threshold of a 2 CCEs PDCCH), or set in accordance with the wideband CQI reported by the UE.

The DL Grants and the corresponding PUSCHs (Physical Uplink Shared Channel) in the above-mentioned embodiments may include a dynamic scheduling DL Grant and its corresponding PUSCH; and an uplink semi-persistent scheduling active signaling and the first PUSCH allocated by a semi-persistent scheduling active signaling. The uplink semi-persistent scheduling active signaling and the non-first PUSCH allocated by the semi-persistent scheduling active signaling is not involved in the present invention.

In the above embodiments, the positive and negative modified values may be set in accordance with a PDCCH BLER target value. For example, the PDCCH BLER target value may be set as 1%. The process of setting the modified value in accordance with the PDCCH BLER target value has been described above, and it will not be repeated herein. It should be appreciated that, in the above steps, the increase or decrease of the SINR will not necessarily decrease or increase the number of CCEs occupied by the DL Grant PDCCH, and the current number of CCEs may likely remain unchanged. The number of CCEs occupied by the DL Grant PDCCH will decrease or increase only when the SINR increases or decreases to a certain extent (i.e., the extent to which the number of CCEs needs to be adjusted).

Alternatively or additionally, in one embodiment, after the judging module 302 judges whether or not the UE has received information transmitted on the DL Grant PDCCH successfully, the adjusting module 303 may adjust the transmission power of the DL Grant PDCCH. To be specific, as mentioned above, when the judging module 302 determines that the UE has received the DL Grant PDCCH successfully, the adjusting module 303 may increase the current SINR of the UE and correspondingly decrease the transmission power of the DL Grant PDCCH, and when the judging module 302 determines that the UE has not received the DL Grant PDCCH successfully, the adjusting module 303 may decrease the current SINR of the UE and correspondingly increase the transmission power of the DL Grant PDCCH.

It should be appreciated that, the way for dividing the modules included in the base station for adjusting the DL Grant PDCCH of the UE as mentioned above is merely for illustrative purpose. If the modules are divided in the other ways or no module is divided, the base station shall also fall within the scope of the present invention if only it has the mentioned functions.

Further, the base station for adjusting the DL Grant PDCCH of the UE may also comprise the functional modules capable of executing the above-mentioned steps in the method for adjusting the DL Grant PDCCH of the UE. The principle for executing the function is the same as that for executing the step, and it will not be repeated herein.

It should be appreciated that, the present invention may be provided as a method, a system or a computer program product, so the present invention may be in the form of full hardware embodiments, full software embodiments, or combinations thereof. In addition, the present invention may be in the form of a computer program product implemented on one or more computer-readable storage mediums (including but not limited to disk memory, CD-ROM and optical memory) including computer-readable program codes.

The present invention is described with reference to the flow charts and/or block diagrams showing the method, device (system) and computer program product according to the embodiments of the present invention. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present invention. So, the attached claims are intended to include the preferred embodiments and all of the modifications and alterations that fall within the scope of the present invention.

Obviously, a person skilled in the art may make various alterations and modifications without departing from the spirit and scope of the present invention. If these alterations and modifications fall within the scope of the appended claims and the equivalents thereof, they are also intended to be included in the present invention.

What is claimed is:

1. A method for adjusting a downlink grant physical downlink control channel of a User Equipment (UE), comprising:
    receiving a signal transmitted on an uplink resource corresponding to a current downlink grant physical downlink control channel from the UE;
    judging whether or not the UE has received information transmitted on the downlink grant physical downlink control channel successfully in accordance with the received signal; and
    modifying a current Signal to Interference plus Noise Ratio (SINR) of the UE in accordance with the judgment result, and determining the number of Control Channel Elements (CCEs) occupied by the downlink grant physical downlink control channel and a transmission power of the downlink grant physical downlink control channel in accordance with the modified SINR of the UE; wherein
    if the modified SINR is between demodulation threshold SINRs corresponding to two CCE levels respectively, further adjusting the transmission power of the downlink grant physical downlink control channel.

2. The method according to claim 1, wherein the judging whether or not the UE has received information transmitted on the downlink grant physical downlink control channel successfully comprises:
    detecting whether or not the received signal includes an Acknowledgement ACK signal or a Negative Acknowledgement NACK signal, so as to determine whether or not the UE has received information transmitted on the downlink grant physical downlink control channel successfully.

3. The method according to claim 2, wherein the detecting whether or not the received signal includes the Acknowledgement ACK signal or the Negative Acknowledgement NACK signal, so as to determine whether or not the UE has received information transmitted on the downlink grant physical downlink control channel successfully comprises:
    if the received signal includes the ACK or NACK signal, judging that the UE has received information transmitted on the downlink grant physical downlink control channel successfully; and
    if the received signal does not include the ACK or NACK signal, judging that the UE has not received information transmitted on the downlink grant physical downlink control channel successfully.

4. The method according to claim 1, wherein when it is judged that the UE has received information transmitted on the downlink grant physical downlink control channel successfully, the determining the number of CCEs occupied by the downlink grant physical downlink control channel and the transmission power of the downlink grant physical downlink control channel comprises:

increasing the current SINR of the UE;
determining the number of CCEs occupied by the downlink grant physical downlink control channel and the transmission power of the downlink grant physical downlink control channel in accordance with the increased SINR.

5. The method according to claim 4, wherein an increased value of the current SINR of the UE is determined in accordance with a given PDCCH BLER target value.

6. The method according to claim 1, wherein when it is judged that the UE has not received information transmitted on the downlink grant physical downlink control channel successfully, the determining the number of CCEs occupied by the downlink grant physical downlink control channel and the transmission power of the downlink grant physical downlink control channel comprises:
   decreasing a current SINR of the UE; and
   determining the number of CCEs occupied by the downlink grant physical downlink control channel and the transmission power of the downlink grant physical downlink control channel in accordance with the decreased SINR.

7. The method according to claim 6, wherein a decreased value of the current SINR of the UE is determined in accordance with the given PDCCH BLER target value.

8. The method according to claim 4 or 6, wherein
   the current SINR is indicated by a wideband Channel Quality Indicator (CQI) reported by the UE; or
   the current SINR is obtained in accordance with a path loss value of the UE, the path loss value being determined in accordance with power headroom reported by the UE; or
   the current SINR is a SINR recently transmitted to the downlink grant physical downlink control channel of the UE.

9. A base station for adjusting a downlink grant physical downlink control channel of a UE, comprising:
   a receiving module, configured to receive a signal transmitted on an uplink resource corresponding to a current downlink grant physical downlink control channel from the UE;
   a judging module, configured to judge whether or not the UE has received information transmitted on the downlink grant physical downlink control channel successfully in accordance with the signal received by the receiving module; and
   an adjusting module, configured to modify a current Signal to Interference plus Noise Ratio (SINR) of the UE in accordance with the judgment result of the judging module, and to determine the number of CCEs occupied by the downlink grant physical downlink control channel and a transmission power of the downlink grant physical downlink control channel in accordance with the modified SINR of the UE; wherein
   if the modified SINR is between demodulation threshold SINRs corresponding to two CCE levels respectively, the adjusting module is further configured to adjust the transmission power of the downlink grant physical downlink control channel.

10. The base station according to claim 9, wherein
the judging module is specifically configured to detect whether or not the received signal includes an Acknowledgement ACK signal or a Negative Acknowledgement NACK signal, so as to determine whether or not the UE has received information transmitted on the downlink grant physical downlink control channel successfully.

11. The base station according to claim 10, wherein
the judging module is specifically configured to judge that the UE has received information transmitted on the downlink grant physical downlink control channel successfully if the received signal includes the ACK or NACK signal, and judge that the UE has not received information transmitted on the downlink grant physical downlink control channel successfully if the received signal does not include the ACK or NACK signal.

12. The base station according to claim 9, wherein
the adjusting module is specifically configured to, when the judging module judges that the UE has received information transmitted on the downlink grant physical downlink control channel successfully, increase a current SINR of the UE, and determine the number of CCEs occupied by the downlink grant physical downlink control channel and the transmission power of the downlink grant physical downlink control channel in accordance with the increased SINR.

13. The base station according to claim 12, wherein
the adjusting module is specifically configured to determine an increased value of the current SINR of the UE in accordance with a given PDCCH BLER target value.

14. The base station according to claim 9, wherein
the adjusting module is specifically configured to, when the judging module judges that the UE has not received information transmitted on the downlink grant physical downlink control channel successfully, decrease a current SINR of the UE, and determine the number of CCEs occupied by the downlink grant physical downlink control channel and the transmission power of the downlink grant physical downlink control channel in accordance with the decreased SINR.

15. The base station according to claim 14, wherein the adjusting module is specifically configured to determine a decreased value of the current SINR of the UE in accordance with a given PDCCH BLER target value.

16. The base station according to claim 12 or 14, wherein the adjusting module is specifically configured to determine the current SINR in the following manners:
   the current SINR is indicated by a wideband CQI reported by the UE; or
   the current SINR is obtained in accordance with a path loss value of the UE, the path loss value being determined in accordance with power headroom reported by the UE; or
   the current SINR is a SINR recently transmitted to the downlink grant physical downlink control channel of the UE.

* * * * *